United States Patent Office 3,245,812
Patented Apr. 12, 1966

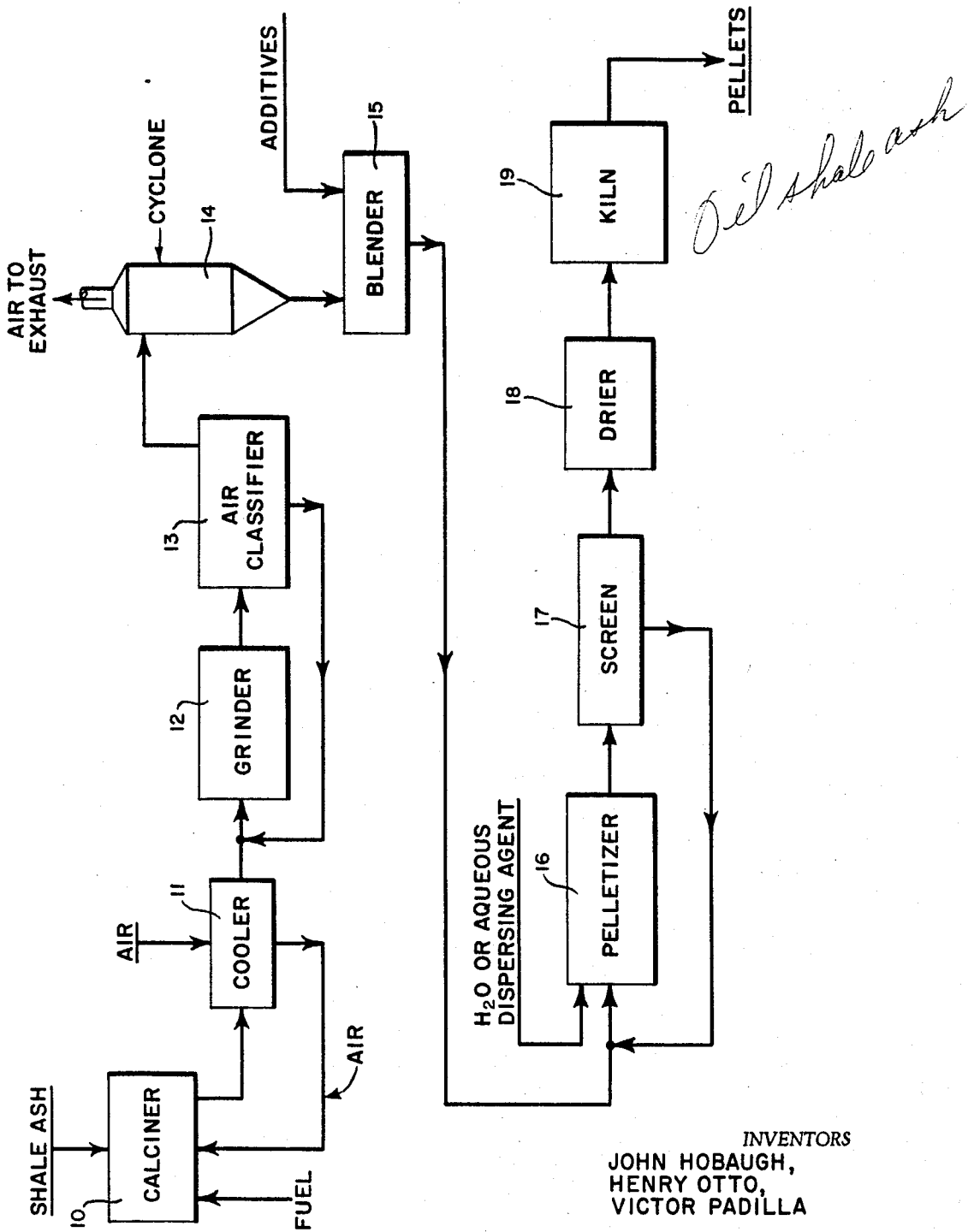

3,245,812
SHAPED REFRACTORY HEAT EXCHANGE BODIES AND PROCESS FOR MAKING SAME
John Hobaugh and Henry Otto, Denver, Colo., and Victor Padilla, St. Louis, Mo., assignors to The Oil Shale Corporation, New York, N.Y., a corporation of Nevada
Filed July 19, 1962, Ser. No. 210,884
25 Claims. (Cl. 106—63)

This invention relates to shaped refractory bodies particularly adapted for use in heat exchange processes and to a process for forming such bodies. More particularly, this invention relates to improved shaped refractory bodies comprising oil shale ash and to a process for forming such bodies. The shaped refractory bodies of the invention are characterized by greatly improved compressive strength, impact strength, and abrasion resistance at the high temperatures normally encountered in heat exchange processes.

Pyrolytic processes conventionally are operated in the presence of solid heat-carrying bodies or "pebbles" which maintain requisite substantially uniform temperatures in the pyrolysis zone. Exemplary of such processes is that described in U.S. Patent 2,788,313, which discloses a pyrolytic separation of oil from oil shale, wherein the shale and the heat exchange bodies are disposed in milling contact. In most solid-to-solid heat exchange processes, the heat exchange bodies are subjected to considerable mechanical and thermal stress, and in such processes as the shale pyrolysis process of U.S. Patent 2,788,313, they are subjected additionally to severe abrasive forces. Thus, satisfactory heat-carrying bodies must possess not only high thermal and mechanical strength, but also requisite resistance to abrasion.

One material which satisfactorily fulfills such requirements and has enjoyed extensive commercial use is alumina. Inasmuch as alumina is expensive, particularly in the quantities required by commercial plant operations, the art has continued to seek other solutions to the problem of satisfactory heat exchange body compositions. Among various materials previously suggested for use in such heat exchange bodies is oil shale ash, a waste product obtained from oil shale pyrolysis. Heat exchange bodies as conventionally prepared from relatively coarse particles of oil shale ash have been found to lack the high compressive strength, impact strength, and abrasion resistance properties necessary to their practical employment in the reheating procedures requisite to a commercial cyclic process.

It is an object of this invention to provide shaped heat transfer bodies comprising oil shale ash and exhibiting improved compressive strength, impact strength, and abrasion resistance.

Another object is to provide a process for producing shaped heat transfer bodies from finely ground oil shale ash, which bodies are characterized by requisite mechanical properties, for use in conventional industrial equipment and processing techniques.

A further object is to provide heat transfer bodies which are relatively economical to make and use and are well adapted for industrial use in such thermal processes as the pyrolysis of oil shale.

Still another object is to provide a method for preparing heat transfer bodies by fashioning cohesive shaped bodies from oil shale ash and firing such bodies at a temperature just below their melting point to produce hard, coherent, homogeneous masses characterized by low porosity, fine crystal grain size, and uniform grain size and structure throughout their mass.

A specific object of the invention is to provide heat transfer bodies by a process comprising shaping very finely ground oil shale ash into formed bodies and firing such bodies at a temperature safely below the melting point of the oil shale ash.

Another specific object is to provide shaped heat transfer bodies containing a major proportion of oil shale ash and a minor proportion of one or more stable refractory inorganic oxygen-containing additives.

Additional objects will become apparent from the following detailed description.

Generally described, the invention relates to shaped refractory heat exchange bodies comprising oil shale ash and to a process for producing such bodies which comprises the steps of forming finely ground oil shale ash, either alone or in combination with a minor proportion of additives, into shaped, cohesive masses and firing said shaped masses at a temperature just below their melting point to produce hard, coherent, homogeneous masses characterized by good thermal and mechanical properties, requisite abrasion resistance, low porosity, fine crystal grain size, and substantial uniformity of grain size and structure throughout their mass.

The achievement in the final fired bodies of the requisite properties is dependent upon numerous variables, including the initial fineness to which the oil shale ash is ground, the nature and amount of additives employed, the manner in which the shaped bodies are initially formed or "pelleted," and the temperature at which they are fired. This invention contemplates such a correlation of the various factors in each instance that the final fired product possesses the requisite properties in a degree suitable for use in conventional commercial heat exchange processes.

The "oil shale ash" employed in producing the heat transfer bodies of the invention is the solid residue remaining after subjecting oil shale to pyrolysis and thereby extracting the oil. Such shale ash conventionally contains appreciable amounts of residual carbon. In order to insure low porosity in the final product, it is preferable that the shale ash, after it is removed from the shale pyrolysis plant, be calcined before it is employed in the pelletizing operation. The optimum calcination temperature is in the range of from about 1500° F. to about 1700° F., preferably about 1600° F.

In accordance with this invention, the comminuted shale ash which is to be employed in the production of heat exchange bodies should be of very fine mesh size. When additives are to be included, a somewhat coarser cut is operable than when the ash is to be used alone. Specifically, according to this invention, heat exchange bodies having the requisite properties can be produced from oil shale ash alone if the ash is ground to such a fineness that at least 99% of the ash particles will pass a 400 mesh Tyler screen. When additives are to be employed, it is unnecessary to grind the ash to such a degree. Bodies having requisite properties and containing suitable additives have been produced from cuts in which at least about 55%, and preferably at least about 75%, of the ash particles are finer than 200 mesh. Particularly desirable bodies have been produced from shale ash-additive mixtures in which the particles are fine enough that from about 70 to about 90% of them will pass a 400 mesh screen.

Oil shale ash is chemically comprised in the main of silica, alumina and calcium oxide, together with amounts in the order of one to five percent of ferric oxide, magnesium oxide, potassium oxide and sodium oxide. The proportions of the main components present vary greatly, depending to some extent upon the source of the oil shale from which the ash is produced. Moreover, different samples taken from the same shale formation exhibit a wide variation in proportions of components present. According to the invention, the thermal, mechanical and abrasive properties of heat exchange bodies produced from oil shale ash may be enhanced by initially blending with the shale ash a minor proportion of one or more of its initial major components, viz., silica, alumina or calcium oxide. Such materials may be added in pure or combined form and include quartz, siliceous sandstone, diatomite, agate, bauxite, pyrophyllite, limestone, aluminum silicate, calcium silicate, calcium aluminate, and the like, as well as alumina, silica, and calcium oxide, per se. Further compounds which are reducible to aluminum, calcium or silicon oxides under the firing conditions and hence may suitably be employed include, inter alia, the carbonates, hydroxides and sulfates of aluminum and calcium and the hydroxides of silicon.

In accordance with the invention, other additives also may be employed singly or in combination to impart particular desirable properties either to the final fired bodies or to the bodies in their green or unfired state. Thus, the addition of alkali metal oxide-yielding substances, such as sodium oxide, potassium oxide, sodium carbonate, potassium carbonate, sodium sulfate, potassium sulfate and the like, contribute to the green or unfired strength of the bodies. Additions of such materials are very advantageous when extensive handling, storing or transporting of the unfired bodies is desirable. Alkali metal carbonates and particularly sodium carbonate also contribute markedly to impact strength of the fired bodies.

An alternative mode of improving the green strength properites of the formed bodies comprises adding a small amount of bentonite, preferably in the order of 0.5 to 2% by weight as disclosed in the copending application S.N. 127,499 of E. C. Sjostrand, filed July 28, 1961. In order for the final fired bodies to exhibit the requisite thermal, mechanical and abrasion resistant properties, bentonite, according to this invention, may be employed in conjunction with a suitable amount of at least one of such additives as silica, alumina or calcium oxide.

When additives are employed according to this invention, the amounts to be added are determined by the purpose for which the bodies are to be used and/or the economics of the process in which they are to be employed. As little as 5% by weight of such additive materials as silica, alumina or calcium oxide will contribute materially to the thermal, mechanical and abrasion resistant properties of the final fired product, assuming that the shale ash cut to be used is not of such fineness that additives are unnecessary. No significant benefit is conferred upon the properties of the final fired product by utilizing more than about 40% by weight of primary additive. Indeed, with calcium oxide or calcium hydroxide, it has been determined that the addition of more than about 40% by weight is actually detrimental to the thermal, mechanical and abrasion resistant properties of the final fired product. With silica and alumina, amounts greater than about 40% by weight are not detrimental to the properties of the product; however, such amounts are unnecessary and, therefore, economically disadvantageous. Preferably, the total amount of additive material in the final fired product is between about 10 and about 30% by weight. It will be appreciated, therefore, that the invention contemplates the employment of additive combinations as, inter alia, at least one alkali metal silicate, aluminate, carbonate or sulfate in conjunction with one or more of free alumina, free silica, bauxite or the like.

The final fired shaped heat exchange bodies of the invention may be fashioned in any particular shape desired. According to the invention, they preferably are spherical so as to exhibit a maximum heat exchange surface. The surface itself may be rough or smooth—if desired it may be "waffled" or corrugated, thereby increasing the available heat transfer surface.

The bodies may be fashioned in any desired size, depending upon the optimum size for the process in which they are to be employed. For oil shale pyrolysis, spherical bodies having diameters ranging from about ¼ inch to 1½ inches are preferred. The optimum diameter for spherical heat transfer bodies to be used in oil shale pyrolysis is about ⅝ inch.

Shale ash conventionally is removed from the pyrolysis plant in two streams, one comprised of particles varying in size from about 5 microns to about 35 mesh and the other comprised of particles sized from about 35 mesh to about 3 mesh. The first of these streams is removed from the pyrolysis plant at temperature of from about 500 to about 600° F.; the second and coarser stream is removed at a temperature of from about 600 to 700° F. In some instances, it may be desirable to feed the separate streams to separate tailings piles and allow them to cool. According to one embodiment of this invention, the shale ash may be utilized without cooling, particularly when it is to be subjected to initial calcination. Subsequent to calcination, a cooling step is desirably employed before any grinding is effected. According to another embodiment of the invention, the shale ash from the pyrolysis plant may be cooled and sized prior to calcination. The most economical operation contemplates the direct calcination of hot unclassified shale ash, followed by cooling and grinding. It will be recognized, however, that grinding and classifying may either precede or succeed the calcination step. After suitable grinding and classification, the fine shale ash particles are then ready either to be blended with additives or to be fed directly into the pellet-forming operation.

According to this invention, the fine shale ash particles are blended with such additives as are to be employed by any suitable method which effects a homogeneous admixture of the components. Preferably, the shale ash and additives are mixed in a separate blending step; however, it is possible to effect admixture during the grinding operation if desired.

After the shale ash is suitably ground and mixed with such additives as are to be used, it is passed to a suitable zone in which the forming of cohesive shaped bodies is effected. According to this invention, it has been found particularly desirable to add water or an aqueous solution of any conventional wetting agent, e.g., dioctyl sodium sulfosuccinate. Such aqueous medium is ordinarily added to the body-forming or pelletizing zone, in order to minimize loss of the finely ground material as dust and to facilitate its being worked up into pellets. The addition of aqueous medium has the further beneficial effect of contributing materially to the green strength of the formed bodies, particularly when the aqueous medium contains a wetting agent. According to the invention, addition during the pellet-forming step of from about 1 to about 10% by weight of aqueous medium is desirable whether or not other materials which enhance the green strength of the bodies are present.

According to the invention, the pelletizing process is preferably carried out in such manner in a balling drum or disc pelletizer that the shaped bodies very slowly are agglomerated. Such slow buildup or "lamination" produces pellets of exceedingly low porosity and outstandingly uniform grain size and structure. Thus, pellets formed by the slow buildup process do not exhibit "layering" when viewed in cross section. More rapid formation of the pellets is also contemplated by the invention; however, the products thus obtained do not exhibit as uniform or as reproducible characteristics.

When water or other aqueous solution is employed as described, it preferably is added slowly and in the form of a fine spray or mist. Ordinarily, a drying step is desirably included immediately after pelletizing and prior to firing. If the green strength of the pellets is sufficiently high, this step may be omitted. Drying enhances the green strength, however, and hence, in some instances, it is not only desirable but necessary.

When a drying step is to be employed intermediate the pelletizing and firing steps, the invention contemplates either rapid drying at a relatively high temperature or very slow drying at a somewhat lower temperature. When rapid drying is desired, temperatures in the order of 500 to 600° F. or even higher may be employed. Rapid drying results in less uniform strength development within the pellet than does a slower drying procedure. It is accordingly preferred that the drying be accomplished at a temperature from about 150 to 250° F., preferably about 200° F., and that it be continued for a period of from about 4 to about 24 hours. Air drying at ambient temperature for even longer periods is likewise a suitable alternative.

When no additives are incorporated, the firing step must be operated with very close temperature control to prevent vitrification. In the shale ash itself, the temperature gradient between its solidus and liquidus points is very slight. If the firing temperature employed is at or above the melting point of the composition, the resultant products are vitrified masses lacking the requisite thermal, mechanical and abrasion resistant properties. It is accordingly necessary that the firing temperature be maintained at a temperature just below the melting point of the mass so as to sinter the formed bodies into coherent masses without effecting substantial vitrification of their surfaces. With essentially unmodified shale ash, the firing temperature must be held at a point from 5 to 15° F. below the melting point of the feed mixture and preferably at about 10° F. below its melting point throughout the firing step. When additives are employed, particularly silica, alumina or calcium oxide, the operable temperature range is broadened, i.e., a broader range of temperatures below the melting point of the composition may be employed thus obviating the necessity for such close temperature control. With addition of e.g., 10% of silica, alumina or calcium oxide, firing temperatures 20–30° F. below the melting point may be employed. The firing time may vary considerably. Pellets fired as long as about 28 hours, in some instances do not exhibit discernibly different properties from those held at the firing temperature for only about 2 or 3 hours. In most instances, however, optimum firing times are from about 10 to about 18 hours.

The figure represents the flow diagram of a preferred embodiment of a process for forming heat exchange bodies carried out in accordance with this invention.

Initially oil shale ash is fed to a calciner 10 which may be a fluidized solids unit, a rotary kiln or a Herreshoff unit. The calciner is operated at about 1600° F.

Calcined shale ash from this unit is fed to a cooler 11 in which air is employed as the cooling unit. The effluent air which has become heated by contact with the hot calcined shale ash is cycled to the calciner 10, thus alleviating its heat requirement to some extent.

The cooled calcined shale ash is next passed to a grinder 12, preferably of the ball mill type, and then to an air classifier 13, wherein the large ash particles are separated and recycled to the grinder 12. The particles of requisite size are passed from the classifier into a cyclone separator 14, positioned above a blender 15. From the separator 14 air is exhausted upward, while shale ash particles fall downward into the blender 15. Any solid additives which are to be included are fed into the blender 15. It will be appreciated that when the feed is a shale ash cut having about 99% of its particles finer than 400 mesh, there is no necessity for the blending step, and the blender is then omitted from the flow sheet, the particles being passed directly into the pelletizer 16.

When solid additives are included, the shale ash and additives are blended into a homogeneous admixture in the blender 15, and such mixture is then passed to the pelletizer 16 into which water or an aqueous solution of a wetting agent is concomitantly fed in the form of a mist or spray. Either a drum-type or disc-type pelletizer unit generally is employed, although it will be recognized that molds or pelleting machines or other conventional means will be similarly useful. If molds are to be used, it will, of course, further be recognized that any aqueous medium to be added must be blended with the shale ash mixture prior to pelletizing.

Subsequent to the pelletizer 16, a screen 17 and a recycle circuit are provided so that undersized pellets may be recovered and recycled to the pelletizer. Occasionally a brittle shell forms on the exterior surface of the pellets, particularly when a rapid buildup technique of pellet-forming is employed. In this instance, it is necessary to recycle such pellets to the grinder 12 by means of a circuit not shown rather than to the pelletizer 16.

After screening out the under-sized pellets, the remaining pellets are passed to a dryer 18. When very rapid drying techniques are employed, the exterior surface of the pellets may become brittle and, in this instance, it is again necessary to recycle such pellets to the grinder 12 by means of a circuit not shown.

After the drying step, the pellets are passed to a kiln 19 for firing. Both tunnel and beehive kilns have satisfactorily been employed and these are generally preferred. A rotary kiln is also satisfactory when the pellets have been so compounded, so built up and so dried that their green strength is very high. Those types of firing kiln in which the requisite temperature control cannot be maintained, such as, for example, shaft furnaces, preferably are to be avoided.

Having generally described the invention, the following examples are given by way of illustration:

*Examples 1–20*

Various oil shale ash samples were processed according to the flow diagram of the figure. Initial calcination was effected at 1600–1700° F. for about 1½ hours. After air cooling, the samples were crushed in a Hardinge air-swept ball mill to varying degrees of fineness, as indicated in the table. The crushed samples were sized by means of a Tyler screen of appropriate mesh size, as indicated. Thereupon, in all examples except Example 13, the shale ash particles were passed to the blender and admixed with 1% of bentonite plus varying amounts of additives as specified in the table. All of the additives were crushed, prior to blending, to the same degree of fineness as the oil shale ash. In Example 13, the shale ash particles were passed directly to the pelletizer. In all other examples, the blending operation was immediately followed by pelletizing. In all examples, the particulate masses were fed slowly and incrementally to a rotary drum pelletizer, with concomitant addition of a fine spray of water. The drum was rotated at a speed of about 25 r.p.m. and spherical pellets were discharged therefrom after an interval of 45 to 60 minutes. The major portion of the resultant spheres measured 0.50 to 0.75 inch in diameter. Larger and smaller pellets were screened out, the larger ones being returned to the grinder and the smaller ones to the pelletizing drum. The pellets of satisfactory size were then dried in an oven at 200–500° F. for at least 8 hours to remove moisture. The dried pellets were then passed to an electric furnace heated to about 1500° F. In each example, the furnace temperature was so controlled that it reached the firing temperature, viz., 10° F. below the melting point of the pellet mixture, within about 2 hours. Firing was then continued at that temperature for about 16 hours. The furnace temperature was thereupon gradually reduced to about 1500° F. over a 2-hour period. The pellets were then removed from the furnace and allowed to cool to ambient temperature. The cooled pellets exhibited some shrinkage in comparison to the unfired pellets. This varied from about 5 to about 12%, so that the average diameters of the fired pellets ranged from about 0.44 to about 0.73 inch. In each example the pellets were subjected to the following tests:

(1) *Compressive strength.*—At least 50 pellets were selected at random and preheated to 700° F. in an electric furnace. The pellets were then individually removed from the preheating furnace and dropped into a small tube furnace operated at 1300° F. The pellet in each instance, was held in this furnace for a 10-minute period in order to allow it to reach the furnace temperature. It then was broken under compression, and the applied load in pounds was read from the pressure gauge. Results are summarized in the accompanying table.

(2) *Impact strength.*—For this test a conventional Riehle impact machine was modified by substitution of a small pendulum capable of imparting a maximum of 4.66-foot pounds of energy to the pellets. A sample of 25 pellets was selected at random and heated in a resistance-wound muffle furnace maintained at 1300° F. The pellets were individually removed from the furnace with heated prongs, the muffle being closed again after each removal. The pellet was then placed on the heated surface of the anvil of the machine. The pendulum was immediately released and allowed to strike the pellet within 3 seconds, measured from the time the muffle was opened. By varying the amount of energy imparted by the pendulum, it was possible to calculate at what energy level pellet breakage occurred, as well as what percentage of the pellets broke at a given energy level. All of the impact strengths in the table are expressed as precent breakage occurring at 1.44-foot pounds of energy unless otherwise noted.

(3) *Abrasion resistance.*—This test was performed in a drum consisting of a pipe having an inside diameter of 12 inches and a length of 12 inches divided into two compartments, each 6 inches in length and having a flange and end plate on each end. A rough-surfaced rubber matting was glued to its inside surface. This drum was placed on motor-driven rollers which rotated it at 35 r.p.m. Two 25-pellet samples were weighed and one of which samples was introduced into each end of the drum. The drum was then rotated for 16 hours, after which the pellets were removed, dusted and reweighed. All dust was cleaned from the inside of the drum, and the procedure was repeated until each sample of pellets had been rotated in the drum for a period of 48 hours. The percentage loss in weight was then calculated. The results are summarized in the following table:

Numerous other modifications of this invention will be apparent to those skilled in the art, which modifications will constitute no departure from the inventive concepts recited in the appended claims.

What is claimed is:

1. A fired solid shaped refractory body suitable for use as a heat exchange means and characterized by high resistance to mechanical and thermal stress, high resistance to abrasion, low porosity, fine crystal grain size, and substantial uniformity of grain size and structure throughout its mass, which body consists essentially of oil shale ash initially ground to a fineness such that at least 5% of the particles pass a 200 mesh Tyler screen.

2. A fired solid shaped refractory body according to claim 1 which consists essentially of a major amount of oil shale ash and from about 5 to about 40% by weight of at least one additive material selected from the group consisting of alumina, silica, calcium oxide and alkali metal oxide.

3. A fired solid shaped refractory body according to claim 1 which consists essentially of oil shale ash of such initial particle size that at least 99% of the particles pass through a 400 mesh Tyler screen.

4. A fired solid shaped refractory body according to claim 1 characterized by a generally spherical configuration and having an average diameter of between ¼ inch and about 1½ inches.

5. A fired solid shaped refractory body according to claim 2 which additionally contains from about 0.5 to about 2% by weight of bentonite as a secondary additive.

6. A fired solid shaped refractory body according to claim 2 containing from about 5 to about 40% of silica.

7. A fired solid shaped refractory body according to claim 2 containing from about 5 to about 40% of alumina.

8. A fired solid shaped refractory body according to claim 2 containing from about 5 to about 40% by weight of calcium oxide.

9. A fired solid shaped refractory body according to claim 2 containing from about 5 to about 40% by weight of a mixture of alumina and an alkali metal oxide.

10. A fired solid shaped refractory body according to claim 2 containing from about 5 to about 40% by weight of a mixture of silica and an alkali metal oxide.

11. A fired solid shaped refractory body according to

TABLE

| Ex. | Pellet Composition | | Compressive Strength at 1,300° F. | Impact Strength (Percent Breakage) at 1,300° F. | Abrasion Weight Loss |
|---|---|---|---|---|---|
| | Level of Grind | Additive | | | |
| 1 | 74%—400 mesh | 20% $SiO_2$ | 896 | 63 | 0.50 |
| 2 | do | 40% $SiO_2$ | 1,491 | 48 | 0.42 |
| 3 | do | 10% $Al_2O_3$ | 544 | 88 | 0.42 |
| 4 | do | 25% $Al_2O_3$ | 647 | 75 | 0.55 |
| 5 | 75%—200 mesh | 10% $Al_2O_3$ | 382 | ¹ 100 | 0.98 |
| 6 | 89%—400 mesh | 20% $Ca(OH)_2$ | 474 | 95 | 0.42 |
| 7 | do | 20% $SiO_2$ | 806 | 75 | 0.35 |
| 8 | do | 40% $SiO_2$ | 861 | 80 | 0.85 |
| 9 | do | 10% $Al_2O_3$ | 878 | 100 | 0.44 |
| 10 | do | 25% $Al_2O_3$ | 914 | 85 | 0.65 |
| 11 | 81%—400 mesh | 13% Bauxite | 709 | 80 | 0.25 |
| 12 | do | 32.5% Bauxite | 802 | 80 | 0.45 |
| 13 | 99%—400 mesh | None | 735 | 83 | 0.20 |
| 14 | do | 20% $Ca(OH)_2$ | 557 | 100 | 0.20 |
| 15 | do | 20% $SiO_2$ | 672 | 62 | 1.40 |
| 16 | do | 40% $SiO_2$ | 562 | 60 | 0.80 |
| 17 | do | 10% $Al_2O_3$ | 684 | 95 | 0.40 |
| 18 | 74%—400 mesh | 12% $Na_2CO_3$ | 615 | 16 | 24.00 |
| 19 | 88%—400 mesh | 12% $Na_2CO_3$ | 951 | 10 | 25.50 |
| 20 | 99%—400 mesh | 12% $Na_2CO_3$ | 806 | 10 | 27.50 |

¹ Percent breakage determined at 1.97 foot pounds of energy instead of 1.44 foot pounds.

*Example 21*

Heat exchange bodies are prepared in accordance with the procedure above set forth in which 80% oil shale ash (75% through 200 mesh) initially is blended with 10% by weight of silica and 10% by weight of sodium carbonate. The fired bodies are characterized by excellent compressive strength, impact strength and resistance to abrasion.

claim 2 containing from about 5 to about 40% by weight of a mixture of calcium oxide and an alkali metal oxide.

12. A fired solid shaped refractory body according to claim 2 containing from about 5 to about 40% by weight of a mixture of silica and sodium oxide.

13. A method for making fired solid shaped refractory bodies suitable for use as heat exchange means and characterized by high resistance to mechanical and thermal stress, high resistance to abrasion, low porosity, fine crystal grain size and substantial uniformity of grain size and structure throughout their mass which comprises the steps of forming a mass consisting essentially of oil shale ash particles of such fineness that at least 75% of said particles will pass through a 200 mesh Tyler screen into coherent shaped bodies, firing said shaped bodies at a closely controlled temperature from about 5° to about 30° F. below the melting point of the mass and allowing said fired shaped bodies to cool.

14. A method according to claim 13 in which oil shale ash employed is initially calcined at a temperature of from about 1500° to about 1700° F.

15. A method according to claim 13 in which the oil shale ash employed is initially calcined and ground to the requisite degree of fineness.

16. A method according to claim 13 in which the mass consisting essentially of oil shale particles is a homogeneous mass formed by blending oil shale ash particles of requisite fineness with from about 5 to about 40% by weight of at least one substance selected from the group consisting of alumina, silica, calcium oxide, alkali metal oxide, and substances yielding such materials under firing conditions.

17. A method according to claim 13 in which the mass consisting essentially of oil shale ash consists of oil shale ash particles ground to a degree of fineness such that at least 99% will pass a 400 mesh Tyler screen.

18. A method according to claim 13 in which the shaped bodies are formed by slowly feeding said mass consisting essentially of oil shale ash particles to a pelletizer to which concomitantly is fed a fine mist of an aqueous medium, the shaped bodies are slowly built up within the pelletizer and are then discharged to a drying operation prior to the firing step.

19. A method according to claim 18 in which the aqueous medium is water.

20. A method according to claim 18 in which the aqueous medium is an aqueous solution of a wetting agent.

21. A method according to claim 18 in which the drying operation is effected at about 500° to about 600° F. for about 2 to about 8 hours.

22. A method according to claim 18 in which the drying operation is effected at about 150° to about 250° F. for about 4 to about 24 hours.

23. A method according to claim 18 in which the drying operation is effected with air at ambient temperatures.

24. A method according to claim 13 in which the bodies are formed in a generally spherical shape.

25. A method according to claim 17 in which the bodies are fired at a temperature closely controlled to from about 5 to about 30° F. below the melting point of the mass.

References Cited by the Examiner
UNITED STATES PATENTS

| | | | |
|---|---|---|---|
| 2,170,445 | 8/1939 | Colbert | 106—71 |
| 2,987,407 | 6/1961 | Ulfstedt et al. | 106—97 |
| 3,135,618 | 6/1964 | Friese | 208—11 |

SAMUEL H. BLECH, *Primary Examiner.*
TOBIAS E. LEVOW, *Examiner.*

---

UNITED STATES PATENT OFFICE
CERTIFICATE OF CORRECTION

Patent No. 3,245,812                    April 12, 1966

John Hobaugh et al.

It is hereby certified that error appears in the above numbered patent requiring correction and that the said Letters Patent should read as corrected below.

Column 6, line 21, for "fiiring" read -- firing --; column 8, line 12, for "5%" read -- 75% --.

Signed and sealed this 5th day of September 1967.

(SEAL)
Attest:

ERNEST W. SWIDER
Attesting Officer

EDWARD J. BRENNER
Commissioner of Patents

UNITED STATES PATENT OFFICE
CERTIFICATE OF CORRECTION

Patent No. 3,245,812                                    April 12, 1966

John Hobaugh et al.

It is hereby certified that error appears in the above numbered patent requiring correction and that the said Letters Patent should read as corrected below.

Column 6, line 21, for "fiiring" read -- firing --; column 8, line 12, for "5%" read -- 75% --.

Signed and sealed this 5th day of September 1967.

(SEAL)
Attest:

ERNEST W. SWIDER                                    EDWARD J. BRENNER
Attesting Officer                                          Commissioner of Patents